June 30, 1964 W. R. SINCLAIR 3,139,396

TIN OXIDE RESISTORS

Filed June 28, 1962

INVENTOR
W. R. SINCLAIR
BY Edward M. Fink
ATTORNEY

United States Patent Office 3,139,396

Patented June 30, 1964

3,139,396
TIN OXIDE RESISTORS

William R. Sinclair, Summit, N.J., assignor to Bell Telephone Laboratories, Incorporated, New York, N.Y., a corporation of New York Filed June 28, 1962, Ser. No. 206,067
6 Claims. (Cl. 204—192)

This invention relates to a technique for the preparation of electrical resistors and to the resistors so produced. More particularly, the present invention relates to the preparation of electrically conductive tin oxide films.

Recently, considerable interest has been generated in a class of electrical resistors comprising thin films of tin oxide, alone or in combination with the oxide of antimony or indium. Resistors comprising electroconductive films of this type provide distinct advantages over certain other types of resistors for several reasons, for example, resistance to mechanical damage, high temperature operation, etc. Unfortunately, such devices suffer from certain disadvantages which impose limitations on their use. Perhaps the most significant problems encountered are lack of reproducibility in processing and limitations in the range of resistivities, as well as flaking.

In accordance with the present invention a technique is described for preparing tin oxide resistors with or without the oxide of indium or antimony, such resistors evidencing a range of resistivity beyond 10,000 ohms per square and being reproducible within close tolerances. Briefly, the inventive technique involves depositing a thin film of tin oxide or tin oxide in combination with the oxide of antimony or indium on a suitable substrate by reactive sputtering. Following a thin film of carbon is deposited atop the sputtered film and the resultant assembly baked at temperatures within the range of 600–1000° C.

Other advantages of the present invention will become apparent from the following description taken in conjunction with the accompanying drawing wherein.

Figures 1, 2:
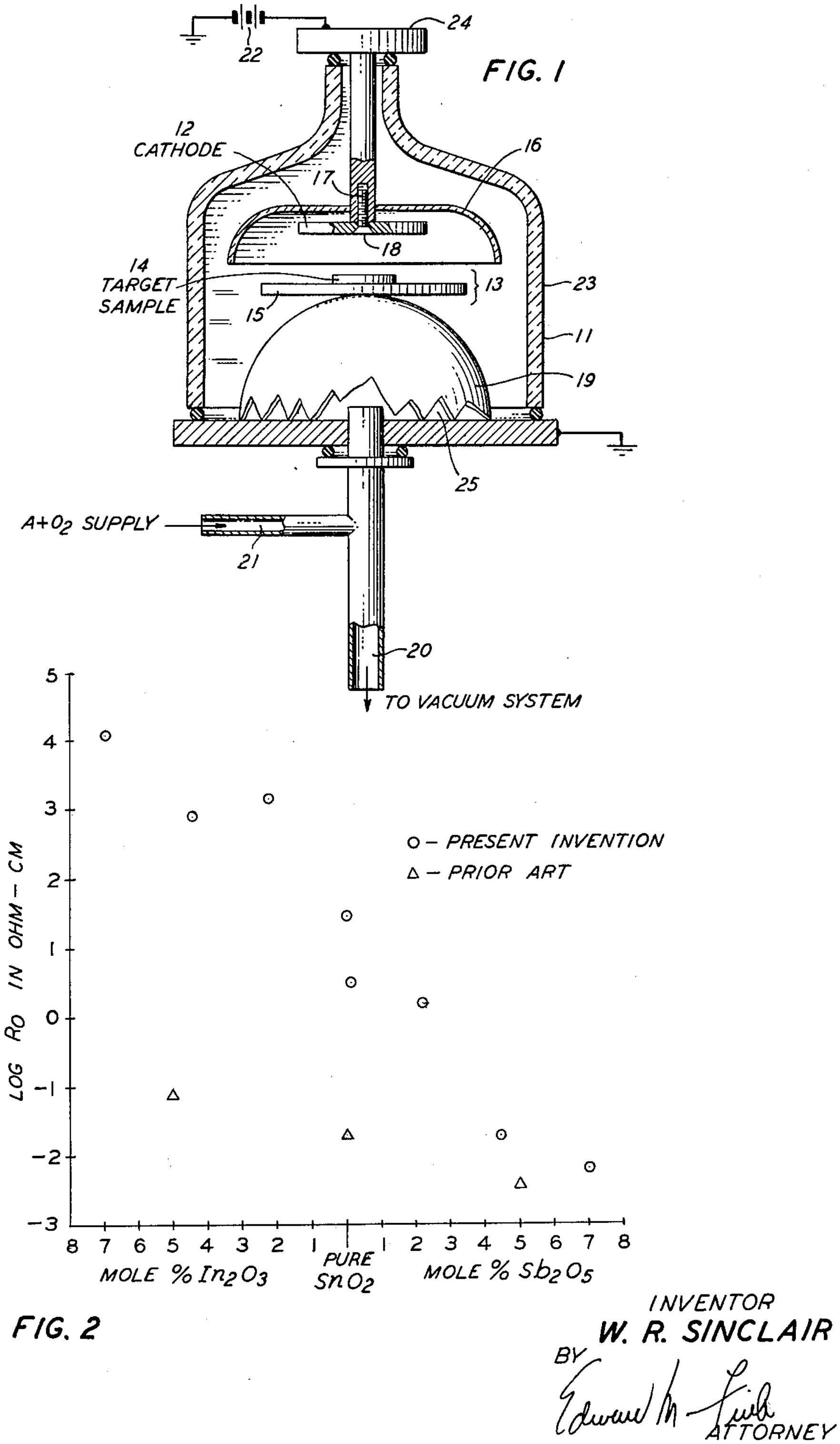
FIG. 1 is a schematic front elevational view of an apparatus suitable for use in producing a tin oxide film by reactive sputtering.
FIG. 2 is a graphical representation on coordinates of log resistivity in ohm-centimeters against film composition in mol percent showing a comparison of resistivity ranges available by prior art techniques and those of the present invention for tin oxide resistors.

With reference now more particularly to FIG. 1, there is shown an apparatus suitable for depositing a thin film of the oxide of tin alone or in combination with antimony or indium oxide. Shown in the figure is a vacuum chamber 11 in which are disposed cathode 12 and anode 13. Cathode 12 may be composed of an alloy of tin and antimony, an alloy of tin and indium or pure tin (99.999+percent pure). The alloys employed may contain from 1 to 8 atom percent antimony or indium, remainder tin. The use of percentages less than the indicated minimum fails to produce the desired improvement in stability and temperature coefficient of the resultant film whereas amounts appreciably beyond the noted maximum fail to result in any further improvement in those characteristics. Deposition occurs upon substrate 14.

Platform 15 is employed as a positioning support for substrate 14 upon which the oxide film is to be deposited. Preferred substrate materials for the purpose of this invention are glass, ceramics and other vitreous materials. Platform 15 may be fabricated from any metal. However, it is convenient to use aluminum for this purpose. Glass shield 16 is placed over substrate 14 so as to restrict the deposition to the desired area.

Cathode 12 comprises a disk, 1 to 2 inches in diameter and approximately ¼ inch in thickness. Cathode 12 is connected to an aluminum rod 17 by means of an aluminum screw 18. Rod 17 serves as an electrical connection to the cathode. Cap 24 serves to hermetically seal the system.

Platform 15 is suitably positioned atop aluminum hemisphere 19 which serves to permit uniform dispersion of the gas during the sputtering reaction through aperture 25. Reaction chamber 11 is preferably composed of fused silica. Provision is made for evacuating chamber 11 via conduit 20 through which a mixture of argon and oxygen or oxygen alone enters, via conduit 21, during the sputtering process. Cathode 12 and anode 13, which are electrically insulated by means of Pyrex pipe 23, are biased by source 22.

In operation of the process, vacuum chamber 11 is first evacuated, flushed with an inert gas, as, for example, any of the members of the rare gas family such as helium, argon, or neon, and the chamber then re-evacuated. The extent of the vacuum is dependent on consideration of several factors.

Increasing the inert gas pressure and thereby reducing the vacuum within chamber 11 increases the rate at which the material being sputtered is removed from the cathode and, accordingly, increases the rate of deposition. The maximum pressure is usually dictated by power supply limitations since increasing the pressure also increases the current flow between anode 13 and cathode 12. A practical upper limit in this respect is 100 microns of mercury for a sputtering voltage of 2000 volts. The ultimate maximum pressure is that at which the sputtering can be reasonably controlled within the prescribed tolerances. It follows from the discussion above, that the minimum pressure is determined by the lowest deposition rate which can be economically tolerated.

After the system has been pumped down, oxygen or oxygen plus argon is admitted into the system via conduit 21. In this manner the pressure is maintained within the range of 10 to 100 microns of mercury.

Next, cathode 12, which may be composed of tin (99.998+percent purity), 92% Sn–8% Sb to 99% Sn–1% Sb or 92% Sn–8% In to 99% Sn–1% In (in the cases of alloy use, the antimony and indium are desirably highly purified), is made electrically negative with respect to anode 13. The minimum voltage necessary to produce sputtering is of the order of a few volts direct-current. However, for the particular geometry utilized in describing the present invention, it is preferred to employ a sputtering voltage within the range of 1500–2000 volts, a pressure within the range of 30–50 microns of mercury and a current within the range of 50–100 milliamperes.

Increasing the potential difference between anode 13 and cathode 12 has the same effect as increasing the pressure, that of increasing both the rate of deposition and the current flow. Accordingly, the maximum voltage is dictated by considerations of the same factors controlling the maximum pressure.

The spacing between anode and cathode is not critical. However, the minimum separation is that required to produce a glow discharge which must be present for sputtering to occur. Many dark striations occur in the glow discharge produced during sputtering. Some of these are well known and have been given names, as for example, "Crooke's Dark Space" (see Joos, "Theoretical Physics," Hafner, New York 1950, page 435 et seq.). For the best efficiency during the sputtering step, substrate 14 should be positioned immediately without Crooke's Dark Space on the side closest to anode 13, approximately 2 inches from cathode 12. Location of substrate 14 closer to cathode 12 results in a deposit of poorer quality. Locating substrate 14 further away from cathode 12 results in the impingement on the substrate by a smaller fraction of the total metal or alloy sputtered, thereby increasing the time necessary to produce a deposit of a given thickness.

It must also be noted that the location of Crooke's Dark Space changes with variations in pressure; it moving closer to the cathode with increasing pressure. As the substrate is moved closer to the cathode it tends to act as an obstacle in the path of gas ions which are bombarding the cathode.

The balancing of those various factors of voltage, pressure and relative positions of the cathode, anode, and substrate to obtain a high quality deposit is well known in the sputtering art.

With reference now, more particularly to the example under discussion, by employing a proper voltage, pressure and spacing of the various elements within the vacuum chamber, a film of tin oxide which may be doped with antimony or indium is deposited upon substrate 14. Sputtering is conducted for a period of time calculated to produce the desired thickness.

For the purposes of this invention, the thicknes of this layer is within the range of 10 to 100,000 Angstroms, such thicknesses being of interest in resistor use.

Following the deposition, a thin film of carbon is deposited upon the oxide film by evaporation, such carbon film having a thickness up to about 150 A. The carbon film may be deposited in any apparatus suitable for vacuum evaporation, for example, in a carbon evaporation kit (#1200 Fullam Co.) at a pressure of $5\times10^{-5}$ millimeters of mercury at a current of 50 amperes. The deposited carbon layer reacts with oxygen in the oxide film and is ultimately volatilized in the form of carbon monoxide or carbon dioxide, thereby increasing the mobility of the remaining oxygen atoms in the oxide film. Although there is no absolute lower limit on the thickness of the carbon film, it will be understood that practical considerations impose a minimum of 15 Angstroms. Carbon films appreciably thicker than 150 Angstroms may be employed but no further beneficial effect results.

Next, the entire assembly is inserted into a furnace and heated in air at temperatures within the range of 600–1000° C. for a time period of the order of 15 to 180 minutes, so producing the desired resistive film. Heating at temperatures below the indicated minimum are too low to accomplish the end result, whereas temperatures in excess of 1000° C. cause reactions between the oxide films and the substrate. All that remains in the preparation of a resistor is the application of suitable electrodes. This may be accomplished by applying a suitable silver paste at both ends of the assembly and firing at temperatures of the order of 500° C. It is to be understood that the electrodes may be attached in any manner well known to those skilled in the art.

Several examples of the present invention are described in detail below. The examples and the general procedure described above are included merely to aid in the understanding of the invention, and variations may be made by one skilled in the art without departing from the spirit and scope of the invention.

EXAMPLE I

A sputtering apparatus similar to that shown in FIG. 1 was employed to reactively sputter a film of tin oxide onto a fused silica rectangular substrate, approximately 1" x ¼" x 1 millimeters. The sputtering electrode was a disk 2 inches in diameter and ¼ inch in thickness and contained tin of 99.998+ percent purity. In the apparatus employed, the anode was grounded, the potential difference being obtained by making the cathode negative with respect to ground.

The vacuum chamber was initially evacuated to a pressure of the order of one micron of mercury, flushed with argon and oxygen and re-evacuated to 30 microns of mercury with the argon and oxygen flowing into the chamber.

The anode and cathode were spaced approximately 2 inches apart, the substrate being placed therebetween at a position immediately without Crooke's Dark Space. A direct-current voltage of approximately 1800 volts was impressed between the anode and the cathode. Sputtering was conducted for 120 minutes, producing an oxidized tin film approximately 3500 Angstroms thick upon the fused silica substrate.

Following the sputtering, a thin film of carbon having a thickness of approximately 125 Angstroms was evaporated upon a tin oxide film, such evaporation being conducted in a carbon evaporation kit (#1200, Fullam Co.) at a pressure of $5\times10^{-5}$ millimeters of mercury at a current of 50 amperes. Pure carbon rods with sharpened points were employed as the electrodes, such rods having a length of 5 millimeters and a neck having a diameter of approximately 1 millimeter.

Next, the assembly was inserted into a furnace and heated to a temperature of 710° C. for 60 minutes. Finally, silver paste comprising finely dissolved silver and 8 weight percent of a lead borosilicate glass suspended in amylacetate and Cellosolve acetate was applied at opposite ends of the assembly and dried at 500° C. Resistance measurements were then made at room temperature with a Kiethley 610 A Electrometer. The results are shown in FIG. 2.

EXAMPLE II

The procedure of Example I was repeated with the exception that cathode 12 was an alloy of 95.55% tin and 4.45% indium prepared by melting together 99.998+ percent pure tin and 99.999+ percent pure indium in a graphite crucible and solidifying the melt into a porcelain disk.

EXAMPLE III

The procedure of Example II was repeated with the exception that cathode 12 was an alloy of 95.55% tin and 4.45% antimony prepared in the same manner as the alloy described above.

In order to more fully appreciate the full impact of the present invention, reference is made to Table I wherein there is shown a comparison of resistances of six tin oxide resistors prepared in accordance with the procedure described in Example I. However, only three of the resistors were subjected to carbon coating prior to heat treating. Examination of the results obtained clearly indicates a marked improvement in reproducibility in addition to avoiding detrimental flaking.

*Table I*

| Example | Carbon Coated (Resistance in ohms) | Uncoated (Resistance in ohms) |
|---|---|---|
| (1) | $3.3\times10^3$—no flaking | $1.8\times10^3$—flaking. |
| (2) | $3.1\times10^3$—no flaking | $8.0\times10^3$—flaking. |
| (3) | $3.5\times10^3$—no flaking | $7.0\times10^3$—flaking. |

Referring now to FIG. 2 there is shown a graphical representation on coordinates of log resistivity in ohm-centimeters against film composition in mol percent of indium, antimony and tin oxides for resistors produced in accordance with the present invention and those prepared in typical prior art fashion by hydrolyzing a volatile tin compound on a heated surface. Analysis of the curve indicates the expanded range of resistivities available by the described technique.

While the invention has been described in detail in the foregoing specification, it will be appreciated by those skilled in the art that variations can be made without departing from the spirit and scope thereof.

What is claimed is:

1. A method for the fabrication of a resistive film which comprises the steps of reactively sputtering a material comprising at least 92 atom percent tin, upon a substrate in the presence of oxygen, thereby forming an oxidized film having a thickness of at least 10 Angstroms on the said substrate, coating said film with a thin layer of carbon having a thickness of at least 15 Angstroms and heating the resultant assembly at a temperature within the range of 600–1000° C.

2. A method in accordance with the procedure of claim 1 wherein said layer of carbon has a thickness within the range of 15 to 150 Angstroms.

3. A method in accordance with the procedure of claim 1 wherein the said heating is conducted for a time period within the range of 15 to 180 minutes.

4. A method in accordance with the procedure of claim 1 wherein said film consists essentially of tin oxide.

5. A method in accordance with the procedure of claim 1 wherein said film consists essentially of 95.55 mol percent Sn–4.45 mol percent In.

6. A method in accordance with the procedure of claim 1 wherein said film consists essentially of 95.5 mol percent Sn–4.45 mol percent Sb.

References Cited in the file of this patent

UNITED STATES PATENTS

| | | |
|---|---|---|
| 1,713,834 | Coppers | May 21, 1929 |
| 1,736,457 | Merten | Nov. 19, 1929 |
| 2,057,431 | Hobrock | Oct. 13, 1936 |
| 2,112,975 | Penning | Apr. 5, 1938 |
| 3,078,192 | Ahrens | Feb. 19, 1963 |
| 3,085,913 | Caswell | Apr. 16, 1963 |

FOREIGN PATENTS

| | | |
|---|---|---|
| 89,651 | Netherlands | Dec. 15, 1958 |

OTHER REFERENCES

Article by Overbeck, Journal of the Optical Society, "Color in Films of Sputter Tin," March 1933, pages 109–113.